United States Patent

[11] 3,604,534

| [72] | Inventor | Jack L. Whitaker<br>Horseheads, N.Y. |
|---|---|---|
| [21] | Appl. No. | 861,360 |
| [22] | Filed | Sept. 26, 1969 |
| [45] | Patented | Sept. 14, 1971 |
| [73] | Assignee | Hardinge Brothers, Inc.<br>Elmira, N.Y. |

[54] AUTOMATIC METERED, PULSING LUBRICATION SYSTEM
7 Claims, 2 Drawing Figs.

[52] U.S. Cl. ...................................................... 184/7 R,
91/46, 92/154, 184/56 R
[51] Int. Cl. ...................................................... F16n 7/00
[50] Field of Search ........................................... 184/55, 56,
7 C, 7, 55 A, 56 A, 18; 91/46; 92/154

[56] References Cited
UNITED STATES PATENTS

| 2,698,604 | 1/1955 | Edwards.......................... | 92/154 X |
| 2,869,514 | 1/1959 | Gluss............................... | 184/18 X |
| 3,076,525 | 2/1963 | Lansky et al.................... | 184/55 |
| 3,112,013 | 11/1963 | Tine ................................ | 184/55 X |
| 3,297,106 | 1/1967 | Hanson et al. ................. | 184/7 |
| 3,432,004 | 3/1969 | Lyth................................ | 184/7 X |

*Primary Examiner*—Manuel A. Antonakas
*Attorney*—Shlesinger, Arkwright and Garvey

ABSTRACT: An automatic metered, pulsing lubrication system for a pneumatic piston and cylinder device including an adjustable metering valve operative in response to momentary pressure changes in the air lines to inject a metered quantity of lubricant in the air line, the lubricant being carried to the cylinder by the airstream through the air line. The system may be utilized to lubricate the piston and cylinder on each stroke of the piston, or on every other stroke of the piston.

PATENTED SEP 14 1971

3,604,534

INVENTOR.
Jack L. Whitaker
BY
Schlesinger, Ashwright & Gowdy
ATTORNEYS

AUTOMATIC METERED, PULSING LUBRICATION SYSTEM

This invention relates to a lubricating system for a pneumatic piston and cylinder operated device.

BACKGROUND OF THE INVENTION

Pneumatic piston and cylinder devices are used for a large variety of operative functions, especially in the machine tool art. Since the compressed gas which is used to power the cylinder is usually dry, a need exists for lubricating the piston and cylinder device to prevent excessive wear. Various devices have been proposed for injecting a quantity of lubricant into the cylinder in timed relation with the actuation of the piston, however, the complexity of these systems has frequently prohibited their utility in a variety of systems.

The lubrication system of this invention is one which is fully automatic, and the lubricant may be injected on each stroke of the piston, or on every other stroke of the piston.

There is no complex injection apparatus for delivering the lubricant, and as such, the simplicity of this invention makes it ideal for many applications.

OBJECTS OF THE INVENTION

It is therefore a primary object of this invention to provide a fully automatic lubricating system for a pneumatic piston and cylinder device.

A further object of this invention is to provide a lubrication system for a pneumatic piston and cylinder device wherein the air pressure which actuates the piston also acts upon the oil to inject it into the cylinder.

A further object of this invention is to provide an automatic lubrication system which is free from complex injector mechanisms.

Yet another object of this invention is to provide an automatic lubrication system for lubricating a pneumatic piston and cylinder on each stroke of the piston or on every other stroke of the piston.

These and other objects and advantages of this invention will become apparent when considered in light of the following description and claims.

FIG. 1

Figure 1:
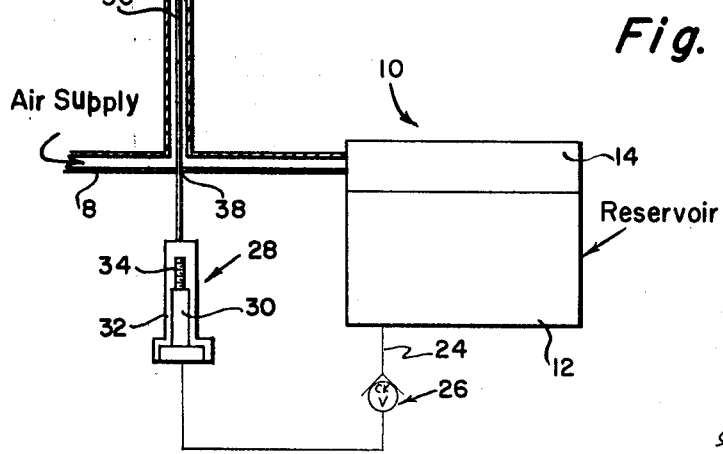
FIG. 1 is a schematic view of one form of this invention.

Referring to FIG. 1 of the drawings, there is shown a cylinder 2 having a piston 4 and piston rod 6 mounted therein. Piston rod 6 is connected to the device to be actuated (not shown).

A source (not shown) of air pressure applied air through line 8 to lubricant reservoir 10. Reservoir 10 contains lubricant 12 and an airspace 14, Air is also delivered through line 16 to a four-way solenoid valve 18. Solenoid valve 18 is used to divert the air pressure to either side of piston 4 through lines 20 and 22, and by selective operation of solenoid valve 18, the direction of travel of piston 4 may be controlled.

Leading from reservoir 10 is a lubricant supply line 24.

The lubricant passes through line 24 to check valve 26 and into metering valve generally designated 28. Metering valve 28 includes a piston 30 in a bore 32. Piston 30 is reciprocable within bore 32 and the length of its travel may be adjusted by any suitable means such as the adjustment screw 34. However, if no adjustment is contemplated, the travel of the piston 30 may be controlled by the dimensions of bore 32.

Lubricant line 36 passes from metering valve 28 into air line 8 at point 38. At this point an airtight seal must be provided to prevent any air leakage. The lubricant line 36 proceeds coaxially with air line 16, but terminates just short of solenoid valve 18 at point 40. At this point, the lubricant line is open.

Check valve 26 serves to prevent any fluid from flowing back into the lubricant reservoir.

OPERATION OF FIG. 1

In operation, air is supplied through line 8 under constant pressure. The pressure thus is present in line 16 and in airspace 14. In this manner, the pressure is constantly applied to the lubricant 12 in reservoir 10 and to the open end 40 of lubricant line 36. Since the pressure is constant and applied equally to both sides of the lubricant system, no lubricant will flow. This will be the case in either position of solenoid valve 18.

However, when solenoid valve 18 is shifted to admit air to the other side of piston 4, there is momentary imbalance of pressure on the lubricant system between points 40 and 14, the pressure in airspace 14 being higher. This causes shifting of piston 30 in metering valve with a simultaneous displacement of quantity of lubricant into the airstream. This lubricant is then carried by the airstream into cylinder 2. After this momentary imbalance of pressure on the lubricant system, a static condition will again be attained in the lubricant because the pressure is constant. Thus piston 30 may settle to the lower portion of bore 32 in metering valve 28 by the action of gravity. The system is then ready for a new cycle to begin.

In this manner, each time valve 18 is shifted, a charge of lubricant will be injected into the airstream and will be carried into the cylinder 2. Thus the cylinder will be lubricated on each stroke.

FIG. 2

Figure 2:
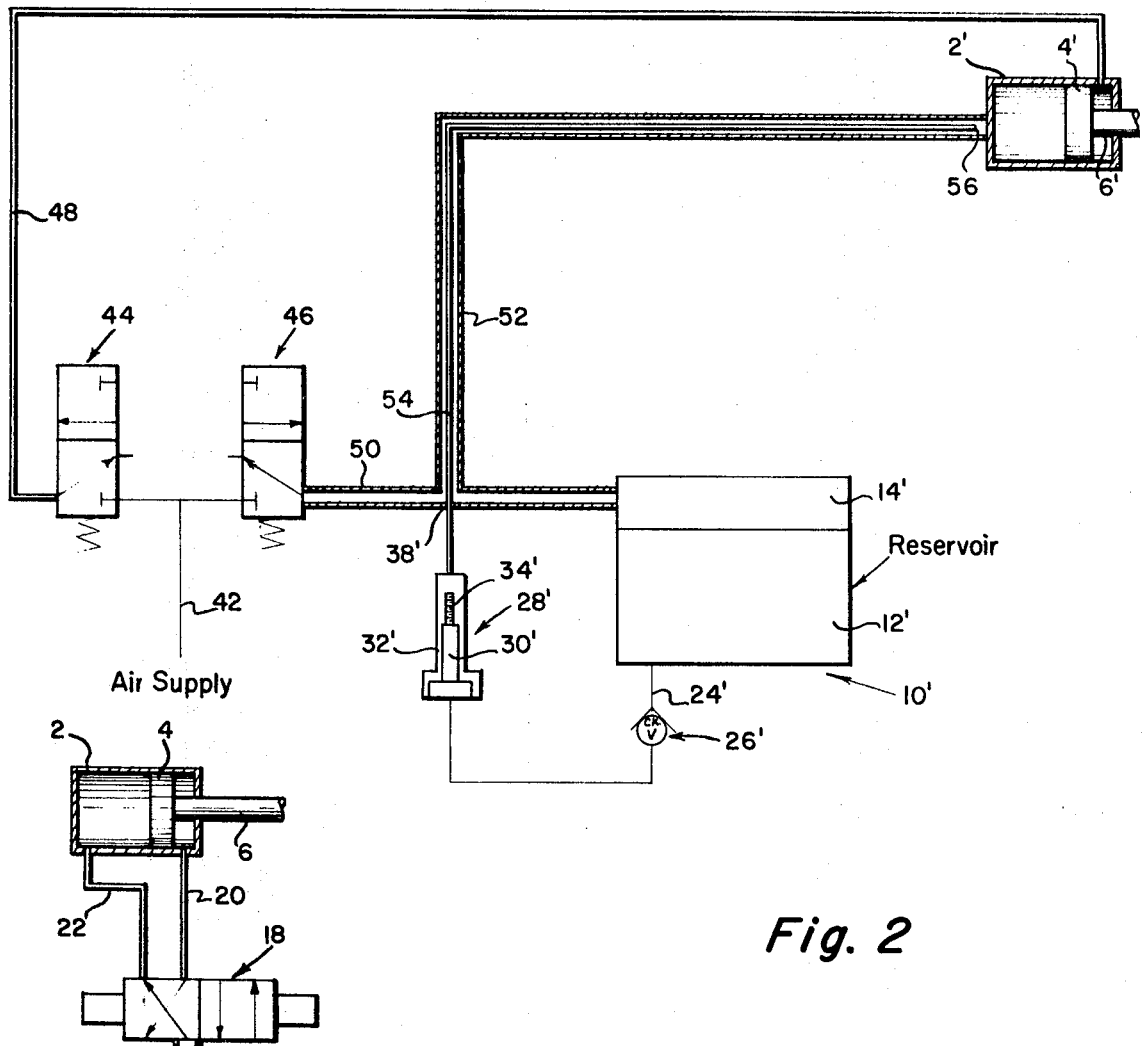
FIG. 2 is a schematic view of an alternate embodiment of this invention.

In FIG. 2 there is shown an alternate embodiment wherein the piston is lubricated only on every other stroke.

In this embodiment, air is supplied through line 42 to either of two three-way solenoid valves 44 and 46. If solenoid valve 44 is actuated, air is diverted through line 48 to the right-hand side of piston 4'. This causes piston 4' and piston rod 6' to be shifted to the left. In this stroke, no lubricant is injected into the cylinder 2'.

If valve 46 is actuated, air is diverted through line 50 into airspace 14' in reservoir 10'. This pressurizes lubricant 12' in reservoir 10'.

Air is also delivered through line 52 to the left end of piston 4', causing piston 4' to be shifted to the right.

Lubricant 12' in reservoir 10' may pass through line 24' and check valve 26' to the metering valve 28'. Metering valve 28' is similar in construction to metering valve 28 of FIG. 1.

The lubricant supply line 54 passes out of metering valve 28' and enters air line 50 at point 38' where an airtight connection exists. Lubricant line 54 continues coaxially with air line 52 to point 56 where lubricant line 54 is open.

OPERATION OF FIG. 2

In this embodiment, no pressure exists in the air lines until valve 46 is shifted. When valve 46 is shifted, air proceeds to fill airspace 14' and also proceeds to cylinder 2'. Because the distance between valve 46 and airspace 14 is less than the distance between valve 46 and airspace 14 is less than the distance between valve 46 and end 56 of lubricant line 54, air pressure is applied to the lubricant in line 54 at point 56. Because of the momentarily greater pressure on the lubricant in the reservoir, a quantity of lubricant is metered into the air line by means of metering valve 28' in a manner similar to the embodiment of FIG. 1. This lubricant is then carried by the airstream into piston 2'.

In addition to the length of the branches of the air line being the factor determining the momentarily greater pressure on the lubricant in the reservoir, other variables also affect the pressure difference. If lines 50 and 52 have the same inside diameter, then the *effective* diameter of line 52 will be less than that of line 50 due to the presence of line 54 coaxially arranged within line 52. This creates a pressure differential between lines 50 and 52 with the resultant injection of lubricant as described.

When the pressure becomes equal on the lubricant 12' in reservoir 10' and upon the lubricant at point 56, the lubricant system becomes static, and piston 30' settles under its own weight to the bottom of bore 32'.

Thus it is seen that each time piston 4' is shifted to the right, a quantity of lubricant is injected in the airstream, however, when the piston 4' is shifted to the left, no lubricant is supplied.

Although this invention has been described in connection with various embodiments thereof, it will be apparent that it is capable of still further modification, and this application is intended to cover any variations, uses, or adaptions of this invention as may come within the scope of the appended claims.

What I claim is:

1. A lubricating system for a pneumatic piston and cylinder device including:
   a. a piston and cylinder means,
   b. an air pressure source,
   c. a reservoir,
   d. a lubricant in said reservoir,
   e. an airspace above said lubricant, in said reservoir,
   f. an air pressure line connecting said air pressure source with said airspace and said piston and cylinder means,
   g. valve means in said air pressure line,
   h. a lubricant line having first and second portions and passing from said reservoir into said air pressure line and having said second portion coaxial and concentrically positioned within a portion of said air pressure line and extending in a direction towards at least one of said means and having its end closely adjacent at least one of said means,
   i. an adjustable metering valve in said lubricant line, and
   j. said metering valve being positioned between said reservoir and said air pressure line and mounted in said first portion of said lubricant line.

2. A lubricating system as in claim 1 and wherein:
   a. said lubricant line extends in a direction toward said valve means and terminates closely adjacent said valve means.

3. A lubricating system as in claim 2 and wherein:
   a. said air pressure source supplies continuous pressure on said lubricant in said reservoir and on said lubricant in said lubricant line.

4. A lubricating system as in claim 3 and including:
   a. check valve means in said lubricant line.

5. A lubricating system as in claim 1 and wherein:
   a. said lubricant line extends in a direction toward said piston and cylinder means and terminates closely adjacent said piston and cylinder means.

6. A lubricating system as in claim 4 and including:
   a. an additional air pressure line communicating with said air pressure source with said piston and cylinder means,
   b. additional valve means in said additional air pressure line.

7. A lubricating system as in claim 6 and wherein:
   a. the length of said air pressure line between said valve means and said piston and cylinder means is greater than the length of said air pressure line between said valve means and said airspace.